Sept. 25, 1951        H. M. STUELAND        2,568,937
ADJUSTABLE ECCENTRIC
Filed Aug. 19, 1948        3 Sheets-Sheet 1
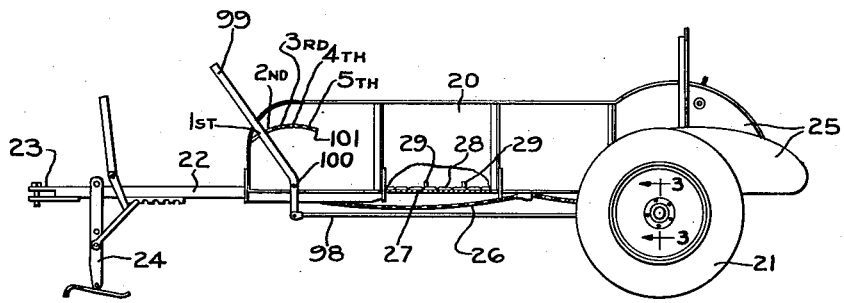
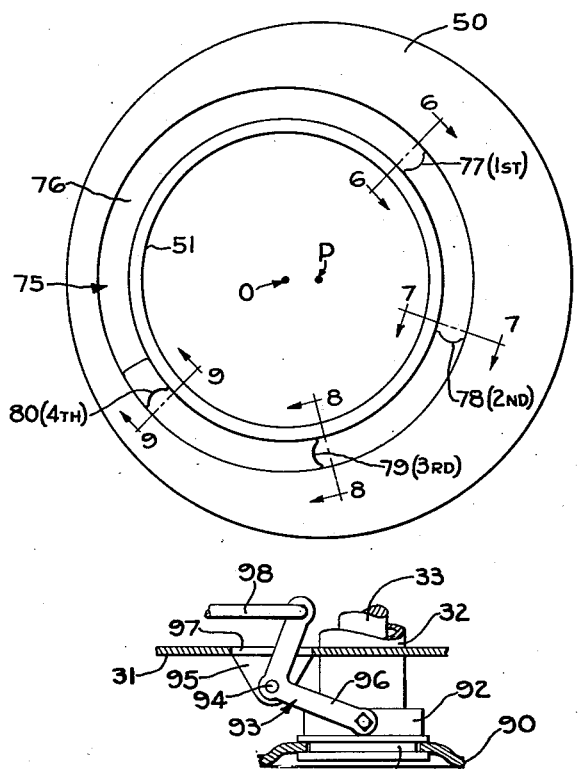
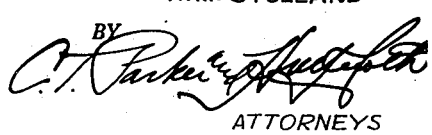
INVENTOR.
H. M. STUELAND
ATTORNEYS

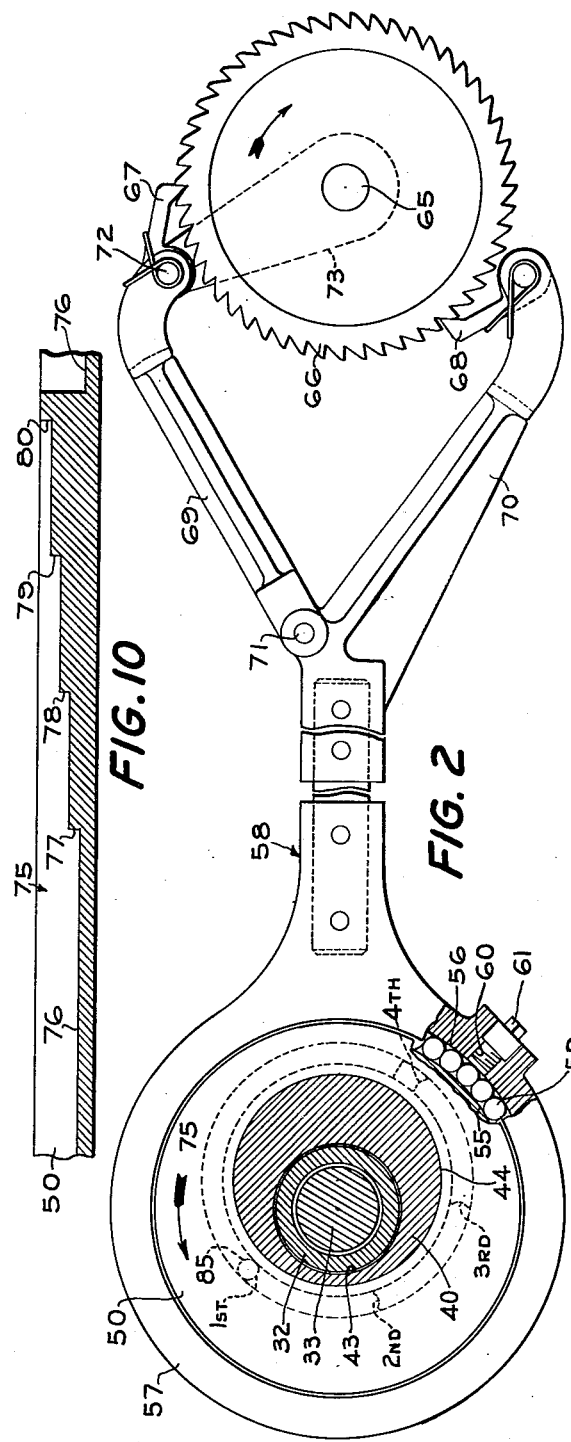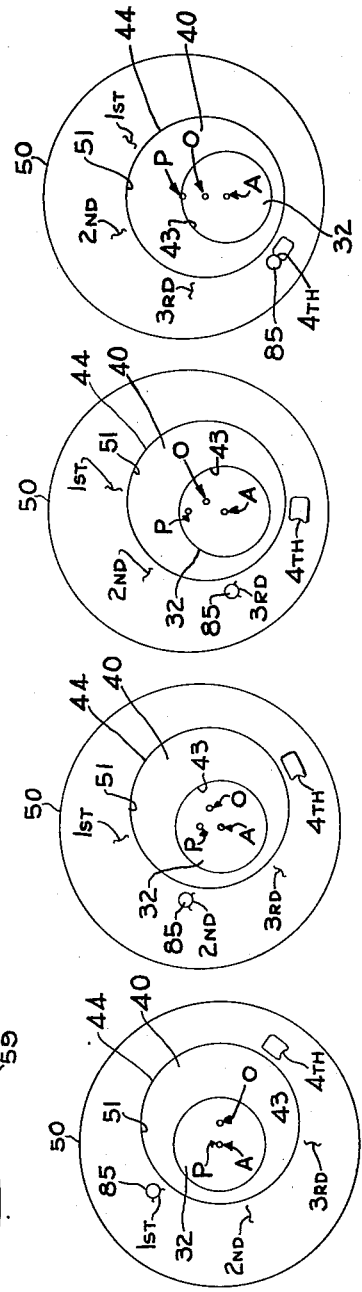
Sept. 25, 1951 — H. M. STUELAND — 2,568,937
ADJUSTABLE ECCENTRIC
Filed Aug. 19, 1948 — 3 Sheets-Sheet 2
INVENTOR.
H. M. STUELAND
ATTORNEYS Sept. 25, 1951  H. M. STUELAND  2,568,937
ADJUSTABLE ECCENTRIC
Filed Aug. 19, 1948  3 Sheets-Sheet 3

INVENTOR.
H. M. STUELAND
BY
ATTORNEYS

Patented Sept. 25, 1951

2,568,937

UNITED STATES PATENT OFFICE 2,568,937

ADJUSTABLE ECCENTRIC

Harold M. Stueland, East Moline, Ill., assignor to Deere & Company, Moline, Ill., a corporation of Illinois Application August 19, 1948, Serial No. 45,174

5 Claims. (Cl. 74—571)

This invention relates to driving mechanism and more particularly to driving mechanism in which rotary motion is converted to reciprocating motion. Still more particularly, the invention relates to driving mechanism of the type referred to in which adjustable means is provided for varying the stroke of reciprocation.

The preferred form of invention disclosed here was developed and is intended primarily for the incremental feeding of the rearwardly moving apron in a manure spreader. Typical manure spreader construction includes a longitudinal body carried on rear wheels and supported at its front end either directly on a tractor or on front wheels including draft means for connection to a tractor. The spreader body is provided with an apron which is conventionally in the form of a pair of laterally spaced chains cross-connected by transverse slats to form a longitudinal, endless conveyor arranged so that the slats move rearwardly over the floor of the spreader body to discharge material at the rear end of the body. Ordinarily, the power for moving the apron or conveyor is derived from one of the rear spreader wheels by means of pawl and ratchet or equivalent step-by-step mechanism so that the apron is driven intermittently to discharge the material in increments. In a spreader of conventional design, the pawl and ratchet mechanism is operated through an arm which engages a multi-lobed cam driven by a spreader wheel. The mechanism includes means by which the stroke of the operating arm can be varied so that the increments in which the apron discharges material can be varied or adjusted.

Most of the disadvantages in mechanism of the type referred to center about the means for converting the rotation of the spreader wheels to reciprocation or oscillation of the operating arm for driving the pawl and ratchet mechanism. Fundamentally, the engagement of the lobes on the driving cam with the oscillating arm is subject to severe impact loading and the parts are relatively short-lived. During high speed operation of the spreader, it is not uncommon to find that one or more lobes of the driving cam have been broken off.

The present invention contemplates and has for a principal object the provision of improved driving mechanism in which all impact loading is eliminated and the driving cam is replaced by smoothly and efficiently operating eccentric means having substantially no inherent vibration. A further and important object of the invention is to provide improved means for adjusting the stroke of the mechanism that is utilized to convert the rotary motion of the spreader wheels to the reciprocating motion of a member which in turn operates the pawl and ratchet mechanism for the apron. Specifically, it is an object of the invention to provide a pair of eccentrics, one of which is adjustable relative to the other and to the rotating axis of the driving wheels, providing, in effect, an adjustable-throw crank.

A still further and important object is the provision of means for relatively adjusting the eccentrics to accomplish variation in the reciprocating stroke. In this respect, it is an object to provide means whereby the adjustment may be effected by remote control means. A further and related object has to do with improved means for selectively setting the control means so that any desired relative adjustment of the eccentrics may be obtained.

The foregoing and other important objects and desirable features of the invention will become apparent to those skilled in the art as a complete disclosure of a preferred form of the invention is made in the following detailed description and accompanying sheets of drawings, in which:

Figure 1 is a side elevational view of a manure spreader of conventional design;

Figure 2 is a side elevational view, on an enlarged scale, of the driving mechanism for the pawl and ratchet means of the spreader apron;

Figure 5 is a detail face view of the adjustable eccentric driving members;

Figure 3:
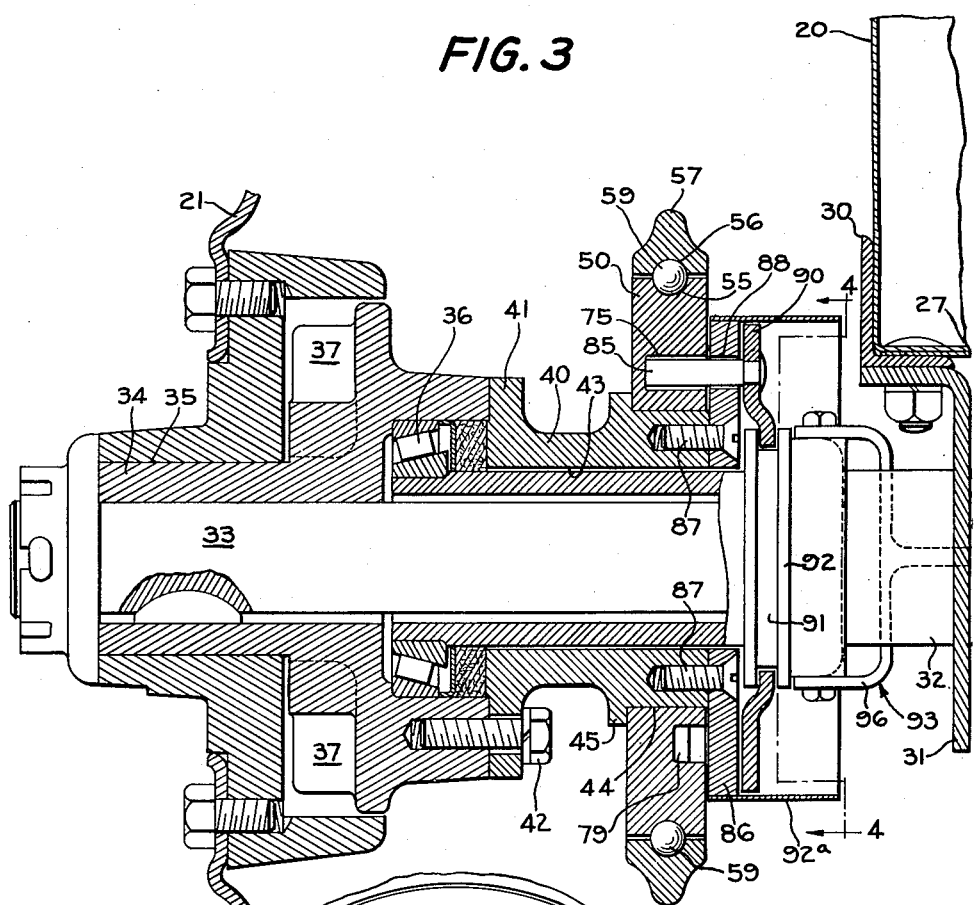
Figure 3 is a transverse sectional view of that portion of the spreader construction centering about the left hand end of the rear axle, the view being on a scale somewhat enlarged over that of Figure 2 and being a section approximately on the line 3—3 of Figure 1.

Figures 6, 7, 8 and 9 are respectively fragmentary transverse sectional views taken on the lines 6—6, 7—7, 8—8, and 9—9 of Figure 5, showing various elements or portions of a circular track by means of which relative adjustment between the two eccentrics is accomplished;

Figure 10 is a sectional development of the control track, showing the stepped relationship between the track or drive elements;

Figures 11, 12, 13 and 14 are diagrammatic illustrations of the eccentric members in different positions of relative angular adjustment; and Figure 15 is a fragmentary view, partly in section, of part of the control means for accomplishing adjustment between the eccentric members.

The general spreader construction shown in Figure 1 is illustrated merely to provide a background for that form of the invention illustrated in subsequent figures in the drawings and is not intended in any way to limit the invention or the applicability thereof. The spreader illustrated is similar to that shown in assignee's patent to Neighbour et al., 2,302,879 and comprises a longitudinal body 20 carried on rear wheels 21 (only one being shown) and having at its forward end a forwardly extending hitch or draft frame 22 provided with a clevis 23 for connection to a tractor and with a supporting stand 24 for supporting the spreader when it is disconnected from a tractor. The rear portion of the body is provided with means for discharging and spreading manure, this means being not shown in Figure 1, because it is concealed by the wall structure designated generally by the numeral 25. However, such mechanism may be conventional, and may be of the type shown in the Neighbour patent referred to.

The body 20 is loaded with manure which is moved rearwardly by an endless conveyor or apron 26 as the spreader is drawn forwardly. A portion of the side wall of the body 20 has been broken away in Figure 1 to expose the floor at 27 and the upper run of the apron or conveyor at 28. The numeral 29 designates slats or bars carried by the apron for engaging the material for moving the same rearwardly to the spreading means at 25.

As best shown in Figure 3, each side of the rear portion of the spreader body 20 is provided with a longitudinally running reenforcing angle 30 to which is secured and from which depends a longitudinally running, vertical plate 31. It will be understood, of course, that the opposite side of the spreader body is similarly constructed so that the plate 31 and a similar plate are transversely spaced apart. The plate carries a transverse tubular axle 32 which is rigidly secured to the plate and held against rotation. The general arrangement to the extent thus far described is illustrated in the Neighbour patent referred to above.

The tube 32 loosely surrounds a rotatable or live axle 33 to the left hand end of which is keyed a hub 34. This hub has an outer cylindrical bearing surface 35 on which is rotatably carried the left hand rear wheel 21. The inner portion of the hub 34 is enlarged and recessed to carry a bearing 36 by means of which the hub is journaled on the outer reduced end of the tube 32. There is provided between the wheel 21 and hub 34 one-way clutch mechanism which operates to connect the wheel 21 to the live axle 33 during normal forward travel of the spreader and which operates to provide for overrunning of the wheel 21 by the axle 33 on left turns. Portions of the overrunning clutch mechanism appear at 37. The other end of the axle 33 is connected in a similar manner to a right hand wheel (not shown). Any suitable mechanism may be substituted for that illustrated, since the particular design forms no part of the present invention, being based on the construction shown in the Neighbour patent, which construction may be considered typical.

Inasmuch as the driving mechanism for imparting step-by-step movement to the apron 26 is located at the left hand side of the spreader body and is tied in with the left hand end of the axle 33, no further reference will be made to structure at the right hand side of the spreader.

The cylindrical outer surface of the tube 32 between the bearing 36 and the plate 31 provides a bearing for journaling a first eccentric driving member 40, the member 40 being thus carried for rotation about the journaling axis which is the common axis of the axle 33 and tube 32. The member 40 is flanged at 41 and is connected to the hub 34 for rotation therewith. The connection may be accomplished by a plurality of cap screws, only one of which is shown at 42 in Figure 3. As best shown in Figure 2, the journaling of the member 40 on the outer cylindrical surface of the tube 32 is accomplished by the provision of a cylindrical bore 43 provided in the member 40 and loosely fitting the tube 32. The cylindrical bore 43 is eccentric with respect to the center of a circular peripheral portion 44 on the member 40. The periphery 44 thus provides an eccentric bearing on the member 40. An annular flange 45 is formed integral with the member 40 adjacent the eccentric bearing 44 and provides a thrust bearing for a second eccentric member 50 which is journaled on the bearing 44. The member 50 is circular, and its periphery is formed about the center P (Figures 5 and 11–14). The mounting of the member 50 on the bearing 44 of the member 40 is accomplished by the provision of a circular opening 51 formed about a center O which is eccentric with respect to the center P. Consequently, the circles 44 and 51 are concentric about the common center O. The center or common axis of the tube 32, axle 33 and inner cylindrical bearing surface 43 of the member 40 is designated by the letter A in Figures 4 and 11–14, inclusive.

From the description thus far, it will be seen that the member 40 is eccentric to and rotatable about the journaling axis A, since it is connected to the driving hub 34. The mounting of the member 50 on the member 40 by means of the circular bearing surfaces 44 and 51 means that the member 50 is journaled or may have angular movement with respect to the member 40. Since the center P is eccentric with respect to the center O, relative angular movement between the members 40 and 50 will vary the relationship between the centers A and P. The invention provides means for controlling the variations between the members A and P and for locking the members 40 and 50 together for rotation in unison about the journaling axis or center A, whereby any point on the periphery of the member 50 may be caused to oscillate in varying amounts. Actually, the eccentricity of O with respect to A is the same as the eccentricity of P with respect to O; in other words, the distance AO equals the distance PO. Consequently, relative angular movement between the members 40 and 50 will at times provide for the coincidence of the centers A and P and the circular periphery of the member 50 will therefore be concentric about the axis A, whereupon the member 50 will rotate but will not oscillate when locked to the member 40 (Figure 11). Further details of the operation and relative adjustment between the members 40 and 50 will appear as the description proceeds.

The periphery of the member 50 is formed with a peripheral groove 55 which is complementary to an internal peripheral groove 56 provided in a circular head 57 of a reciprocating member 58.

The grooves 55—56 provide, in effect, an annular circular bore in which may be provided a plurality of ball bearings 59 for journaling the head 57 of the member 58 on the member 50. The balls are introduced to the bore 55—56 through an inlet 60 provided in the head 57 and normally closed by a removable plug 61 (Figure 2). It will be understood, of course, that any other suitable journal means may be utilized between the head 57 and the member 50.

The rear end of the apron or conveyor 26 may be conventionally mounted on a transverse apron shaft, a representation of which appears at 65 in Figure 2. Thus, rotation of the shaft 65 in the direction of the arrow in Figure 2 will effect movement of the upper run 28 of the chain 26 rearwardly over the floor 27 of the spreader body 20. Incremental movement of the apron rearwardly as aforesaid is accomplished by pawl and ratchet mechanism including a ratchet wheel 66 keyed to the shaft 65 and double-acting pawls 67 and 68 carried respectively on pawl arms 69 and 70 connected to the reciprocating member 58. The upper pawl arm 69 is pivoted at 71 to the member 58 and the opposite end of the pawl arm is controlled by a connection at 72 to an arm 73 which is loose on the shaft 65. The pawl and ratchet mechanism is merely representative of several types of mechanisms that could be employed and this mechanism, per se, forms no part of the present invention. It will be seen that oscillation of the member 50 about the journaling axis A determines the amount of fore and aft reciprocation of the member 58 and thus determines the amount of angular movement that will be imparted to the ratchet wheel 66, which will in turn determine the amount of incremental rear movement of the upper run 28 of the apron or conveyor 26.

The means for interconnecting the members 40 and 50 in various positions of relative angular adjustment will now be described. As best shown in Figures 5–10, the member 50 is provided with a radial face in which is formed an arcuate or circular track 75. The circle of this track is about the center O. The track is preferably separated into two arcuate portions of 180 degrees each, one of which is a base portion 76 of uniform depth as respects the radial face of the member 50 and the other portion of which includes a plurality of track portions 77, 78, 79 and 80, which provide respectively first, second, third and fourth drive elements. The drive elements are fixed in the track 75 in angularly spaced apart relationship about the bearing axis or center O. In comparing Figures 2 and 5, it should be noted that the illustration in Figure 2 is from the left hand side of Figure 3 and the view in Figure 5 is from the right hand side of Figure 3.

Inasmuch as the track portions or drive elements 77, 78, 79 and 80 occupy only one half of the track 75, the angular spacing therebetween is 60 degrees, each designating a different position representing a different annularly adjusted relationship between the members 40 and 50, or a different relationship between the centers A and P. The means for interconnecting the members 40 and 50 for rotation in unison includes a drive element or portion selectively engageable with any one of the first, second, third or fourth drive elements to vary the eccentricity between the centers A and P. A detailed description of this means will follow.

As best shown in Figures 6–10, each of the drive elements 77, 78, 79 and 80 projects outwardly from the base portion 76 of the track 75 to a different height or distance. In the position of the member 50 when assembled, as in Figure 3, the drive elements project in an axial direction away from the base portion 76 of the track. In view of the stepped relationship of the drive elements 77, 78, 79 and 80, each provides an abutment which is selectively engageable with a drive element in the form of a pin 85 connected to the member 40 for rotation therewith but mounted in the member 40 for extension or retraction into and out of the circular track 75 for selective engagement with the abutments provided by the drive elements.

The mounting of the pin 85 on the member 40 is accomplished by means of a circular plate 86 secured to the inner radial face of the member 40 as by a plurality of countersunk screws 87. The radial face of the plate 86 is thus disposed to face the radial face of the member 50 in which the track 75 is formed. The plate 86 is apertured at 88 (Figure 3) and the pin 85 is shiftable for extension into or retraction out of the track 75 through this aperture. The outer end of the pin 85 is rigidly secured to a circular plate 90 which rides loosely in an annular groove 91 provided in an axially shiftable collar 92 carried loosely on the tube 32 between the plate 31 and the plate 86. A circular shield 92a is secured to the plate 86 for rotation therewith and extends axially inwardly to enclose the collar 92. Axial shifting of the collar 92 is accomplished by means of a bell crank 93 pivoted on a vertical axis at 94 to a bracket 95 secured to the proximate plate 31. One arm of the bell crank is in the form of a yoke 96 which embraces the collar 92 and the other arm of the bell crank extends through a slot 97 in the plate 31 for connection to the rear end of a forwardly extending link 98. The forward end of the link 98 is connected to the lower end of a rockable control lever 99 pivoted at 100 to the left side of the body 20 adjacent the forward end thereof. A sector 101 is appropriately carried on the body for cooperation with the lever 99 and has a plurality of notches therein for securing the lever in any one of a plurality of adjusted positions. As will hereinafter more fully appear, the notches in the sector 101 correspond with the positions of relative angular adjustment between the members 40 and 50 and the operator may thereby control the incremental feeding of the apron or conveyor 26.

The operation of the spreader equipped with the driving mechanism disclosed herein is as follows: Figures 1, 2, 3 and 4 show the parts in their relative neutral positions in which rotation of the member 40 by the axle 32 will effect no oscillation of the member 50, since the centers A and P are coincident (see also, Figure 11); hence, there will be no reciprocation of the member 58 and no angular movement of the ratchet wheel 66. Consequently, the apron 26 will remain stationary and there will be no discharge at the rear of the spreader. The neutral positions of the parts are accomplished by a setting of the control lever 99 so that the driving pin 85 is in the deepest portion of the track 75 and in engagement with the first drive element 77. The drive element 77 is formed in the track in such relationship to the centers O and P as to fall on the orbit of the pin 85 when the centers or points A and P are coincident, it being remembered that, since the center A is the journaling axis, it is likewise the axis of the circular interior bearing 43 of the member 40. In other words, with the parts as shown in Figures 2 and 11, the eccentricity of the member 40 with respect to the center A is canceled by the eccentricity of the member 50 with respect to the member 40, and it is the adjustment of the relative eccentricity that governs the amount of oscillation of the member 50.

Assuming now that the operator desires to connect the apron 26 for feeding in the smallest increment possible according to the present design, he will rock the lever 99 rearwardly about its pivot 100 to the second position in Figure 1, thus exerting a forward pull on the link 98 to rock the bell crank 93 for retracting or withdrawing the pin 85 from engagement with the drive element 78. The retraction of the pin will be just enough so that the pin clears the driving element 77 to be in position to engage the next adjacent driving element 78.

Since the pin 85 is the sole driving connection between the members 40 and 50, disengagement thereof from the track 75 in the member 50 provides for relative angular movement between the members 40 and 50 about the bearing axis O. Since the drive elements 77 and 78 are spaced apart an angular distance of 60 degrees, the relative angular movement of the members 40 and 50 will be through a range of 60 degrees. Although the load of the apron on the ratchet wheel 66 will prevent fore and aft reciprocation of the member 58, it will be found that disengagement of the pin 85 from the drive element 77 permits the member 50 to rotate in a clockwise direction through a range of 30 degrees as the member 40 rotates in a counterclockwise direction through a range of 30 degrees, thus effecting a total angular adjustment of 60 degrees, whereupon the parts will assume the position illustrated schematically in Figure 12. It will be noted in this figure that a line extended through the centers A and O will lie at an angle of 30 degrees to the horizontal. Likewise, a line extended through the centers O and P will be at an opposite angle of 30 degrees to the horizontal. The point or center P thus moves vertically upwardly from the fixed center A. Since the point P is now spaced from the center A, the circular periphery of the member 50 is eccentric with respect to the center A and reconnection of the member 50 to the member 40 by the pin 85 for rotation in unison therewith will effect oscillation of the member 50 and consequently effect fore and aft reciprocation of the member 58. The eccentricity between the points A and P is relatively small; hence, the oscillation of the member 50 will be relatively small so that the incremental feeding of the apron will be in relatively small amounts and at a relatively slow speed.

Movement of the control lever 99 to the third notch in Figure 1 will effect retraction of the pin 85 from engagement with the drive element 78 and condition the pin for engagement with the succeeding drive element 79 upon relative angular movement of 60 degrees between the members 40 and 50, whereupon the parts will assume the positions illustrated schematically in Figure 13. In this adjustment of the parts, the eccentricity between the points A and P has increased and the oscillation of the member 50 will be of a greater magnitude, thus increasing the increments of feeding of the apron 26.

Figure 4:
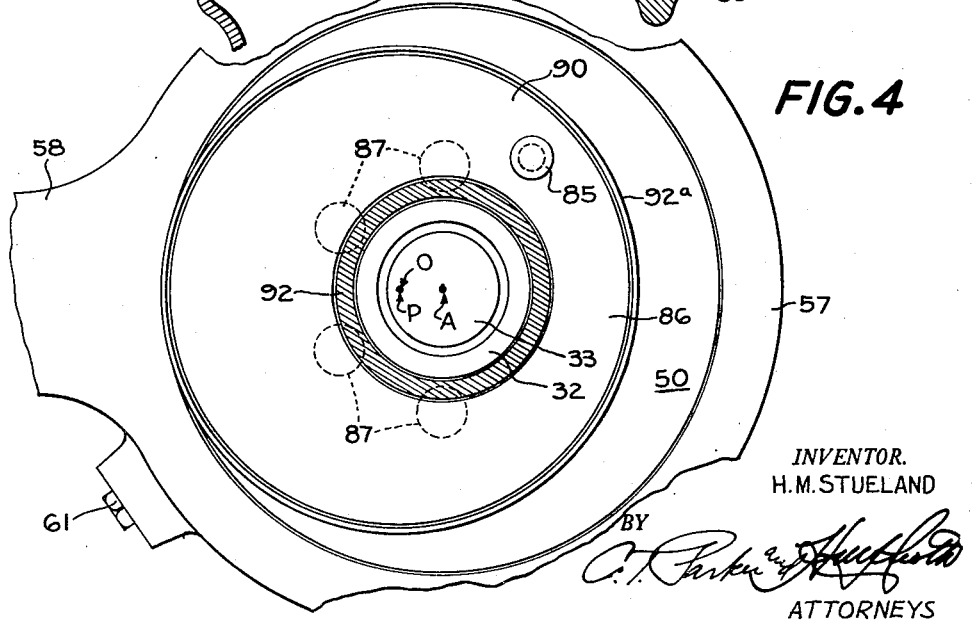
Figure 4 is a fragmentary sectional view on the line 4—4 of Figure 3 and showing part of the control mechanism.

Figure 4 illustrates the maximum adjustment between the members 40 and 50, which is accomplished by adjustment of the control lever 99 to the fourth position so that the pin 85 engages the drive element 80. It will be noted that, although the point P progresses through a range of only 90 degrees with respect to the horizontal in moving from the position of Figure 11 to the position of Figure 14, it actually moves a total of 180 degrees with respect to the point O, since in Figure 14 the point P is diametrically opposite its position in Figure 11 as respects the points A and O.

Since the pin 85, when engaged with the drive element 80, cannot be moved inwardly without first being disengaged from the drive element 80, a fifth notch has been provided on the sector 101, into which the control lever 99 may be moved to retract the pin 85 from the drive element 80. If the lever 99 is left in this position, there will be no driving connection between the members 40 and 50 and there will be no reciprocation of the member 58. Since there is no positive connection between the member 50 and the head 57 of the member 58, whatever oscillation of the member 50 that occurs will be mainly vertical. However, it is preferred that the control lever 99 be restored to its first position to reconnect the members 40 and 50 in that position of angular adjustment thereof in which the points A and P are coincident. This result can be accomplished by movement of the control lever 99 momentarily to the fifth notch in the sector 101, followed by movement of the lever 99 again to its first notch, which latter movement, of course, extends the pin 85 its maximum distance into the track 75 until the pin picks up the member 50 by engagement with the first drive element 77.

According to the type of control means illustrated, the operator need not progress upwardly from one drive element to the other but may control the pin 85 so that the position of the parts shown in Figure 14 may be obtained immediately. In other words, the operator may cause the pin 85 to skip from the first to the fourth position, which he accomplishes by moving the control lever 99 immediately from the first to the fourth position. Similarly, he may skip from the first to the third and second to fourth. By moving the control lever 99 momentarily to the fifth notch in the sector 101, the operator may skip downwardly from any higher drive element to any lower drive element. It will be understood, of course, that forward rotation of the member 40 and the particular stepped arrangement of the drive elements 77, 78, 79 and 80 preclude selection of a lower element without first causing the pin 85 to skip over the element 80 and back into the base portion 26 of the track.

What is claimed is:

1. Driving mechanism, comprising: a first circular member; means providing a journaling axis which is eccentric to the true center of the member and about which the member is rotatable; means including the circular periphery of the member and providing a bearing part about the true center of the member; a second circular member; means on the second member eccentric to the true center thereof and providing a circular bearing part cooperating with the aforesaid bearing part to accomplish a bearing on the true center of the first member for carrying the second member on the first member; means on one member including an arcuate track formed about the axis of the bearing and having a uniform base and plurality of portions angularly spaced apart therein, each portion being disposed at a different level with respect to the base of the track; and means on the other member including an element shiftable toward and away from the track and in selectively different amounts for engagement with any one of said track portions for connecting the members together in various positions of angular adjustment about the bearing axis.

2. Driving mechanism, comprising: a first rotatable member; means providing a journaling axis about which said member is rotatable; bearing means on the member on an axis eccentric with respect to the journaling axis; a second member carried on the first member by said bearing means, for angular movement with respect thereto, and having a circular periphery formed about a center eccentric with respect to the bearing axis, and further having a radial face; circular track means concentric with the bearing axis and providing a plurality of drive elements on the second member spaced angularly apart about said bearing axis and projecting axially outwardly from said radial face in progressively increasing amounts; a third member connected to the first member for rotation therewith about the journaling axis and having a radial face facing the radial face of the second member; means providing an axially directed aperture through the third member in alignment with the circular track; and a driving part shiftably carried in said aperture for extension or retraction in selected amounts toward or away from the circular track means for selective engagement with one of the drive elements on said track means.

3. Driving mechanism, comprising: a first member having a radial face; means providing a journaling axis about which said member is rotatable; bearing means and the member having an axis eccentric with respect to the journaling axis; a second member mounted on the first member by said bearing means and movable angularly with respect thereto and having a radial face facing the radial face of the first member; and means for releasably interconnecting the members in various positions of angular adjustment about the bearing axis, including an arcuate track on the radial face of one member and formed about the bearing axis and having a plurality of drive elements fixed thereon in angularly spaced relationship and projecting axially toward the radial face of the other member in progressively increasing amounts, and a drive element carried by said other member for shifting toward and away from the track in selected amounts for selective engagement with any one of the drive elements in the track, said drive elements in the track presenting abutments engageable by the drive element of the other member from only one side upon relative angular movement of said members, and means shiftable axially of the members and connected to the shiftable drive element for shifting the latter.

4. The invention defined in claim 3, further characterized in that: the track elements occupy substantially 180 degrees of said track and the other 180 degrees of the track is of a uniform height.

5. The invention defined in claim 4, further characterized in that: the portion of the track between each element and its next higher neighbor is substantially at the same level as said element.

HAROLD M. STUELAND.

REFERENCES CITED

The following references are of record in the file of this patent:

UNITED STATES PATENTS

| Number | Name | Date |
| --- | --- | --- |
| 56,631 | Stiles | July 24, 1866 |
| 237,925 | Straub | Feb. 15, 1881 |
| 543,667 | Baker et al. | July 30, 1895 |
| 1,162,336 | Campbell | Nov. 30, 1915 |
| 1,343,254 | Dunn | June 15, 1920 |
| 2,454,881 | Michelman | Nov. 30, 1948 |